Figures 1, 2, 3:
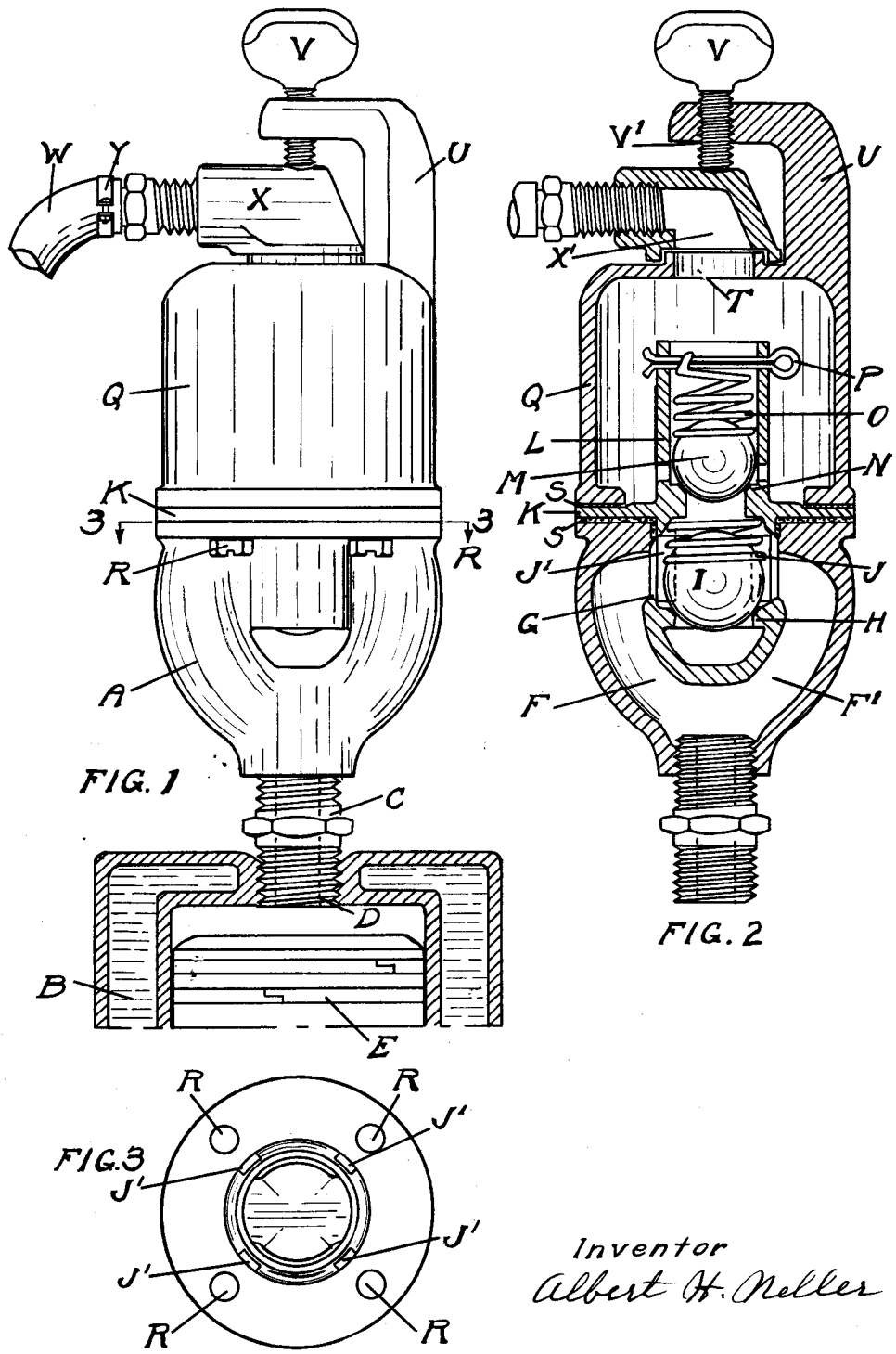

Feb. 14, 1928. 1,659,329
A. H. NELLER
VALVE FOR SUPPLYING COMPRESSED AIR
Filed May 9, 1927

Inventor
Albert H. Neller

Patented Feb. 14, 1928.

1,659,329

UNITED STATES PATENT OFFICE.

ALBERT H. NELLER, OF FAIRFIELD, IOWA, ASSIGNOR TO NEW BOSS MANUFACTURING CO. INC., OF FAIRFIELD, IOWA, A CORPORATION OF IOWA.

VALVE FOR SUPPLYING COMPRESSED AIR.

Application filed May 9, 1927. Serial No. 189,909.

My invention relates to valves adapted to be attached to a cylinder of an automobile or combustion engine, whereby the air from the cylinder may be utilized for operating an air controlled tool, and it consists of providing a double passageway for the air from the intake valve thereby rendering the action of the intake valve more positive and certain and means for attaching the air conveying hose and of other features set forth in the claims and specifications.

In the drawings forming a part of this specification, Fig. 1 is a side view of my device, showing it placed on a vertically disposed section of a cylinder of a combustion engine, only a portion of the cylinder being shown. Fig. 2 is a vertical transverse section of Fig. 1, the part of the cylinder being omitted. Fig. 3 is a horizontal transverse section on line 3—3 of Fig. 1, looking in the direction of the arrows.

Referring to the drawings, A represents the lower part of my valve casing adapted to be attached to the cylinder B of an engine by means of a threaded connection C inserted in the cylinder at the opening D where the spark plug is ordinarily inserted. The cylinder B has the ordinary piston E only the upper portion of which is shown. The connection C is hollowed throughout its length as shown by dotted lines.

The casing A has a bifurcated air passageway F and F' connecting the interior of the cylinder, thru the connection C, with a valve chamber G, on the bottom side of which is formed an intake valve seat H, for the ball valve I. By the use of the bifurcated passageway, an equal suction is exerted on the opposite sides of the intake valve member, thereby securing more positive action of the valve. The valve chamber G has a greater diameter than the ball valve I, and to keep the valve I in alignment with the valve seat, I provide ribs J' (Fig. 3 and dotted lines in Fig. 2) on the sides of the chamber G, which maintains the ball valve I in perfect alignment with the valve seat H.

Secured to the casing A, as will be hereafter explained, is an outlet valve carrying member K, which consists of a plate for attachment to the casing A and a ring shaped projection L which forms a guideway for the outlet valve member M, and keeps it in alignment with its valve seat. A valve seat N is formed on the member K, for the ball valve M and a pin P is inserted through the sides of the ring-shaped projection L, for holding the ball valve M in the ring shaped projection L, when the device is inverted and not in use.

The force of gravity is sufficient for holding the ball valves I and M in seated position when in operative use. It is desirable that the ball valves be kept seated when the device is not in operative use so that foreign substances cannot enter the air chambers and also to prevent the ball valves from rattling while the device is being handled. I preferably use helical springs for accomplishing this, one end of the spring J contacting with the ball valve I, and the other end with the member K, and one end of the spring O contacting with the ball valve M and the other with the pin P.

The casing Q forming an air chamber is securely fastened to the member K and A by means of four bolts R. It is necessary that this connection be air tight and to accomplish this I use paper gaskets S, but any of the well known forms of gaskets may be used. The casing Q has an opening T formed on the upper side of the casing, and has a key-carrying arm U projecting vertically from the side and top of the casing Q. A screw threaded key V engages the threaded opening V' in the projection U, which will be hereafter explained.

The compressed air from my device is conveyed to the air operated tool by means of a hose W. Oftentimes this hose is many feet in length, and it is only by twisting the hose that a screw threaded connection may be used. With my device I employ a fitting X, which is affixed to the hose by the member Y. The fitting X, has an air passageway therein and an opening X' to fit over the opening T in the casing Q. The fitting X is held in engagement with the casing Q by means of pressure exerted from the key V. With this arrangement the hose can be readily and manually attached and detached from my device.

My device has been successfully used with the air controlled tools, and the operation of the device is as follows, when connected with a cylinder of an engine, on the downward stroke of the piston E, the inlet valve I is unseated thereby permitting air to enter the cylinder through the passageways F and F'.

On the upward stroke of the piston the air is forced through the passageways and into the air chamber G. An excessive amount of air therein will cause the outlet valve M to be unseated and permit the air to enter the chamber formed in the casing Q, from which it can only escape through the hose W. The device is simple and effective in operation.

What I claim is:

1. In a compressed air valve, the combination of a casing having a screw threaded end for connection with a cylinder of an engine and an opening at the opposite end, an inlet ball valve and seat therefor in the lower central part of the casing and an outlet ball valve and seat therefor in the upper central part of the casing, a bifurcated air passageway from the inlet valve to the cylinder arranged to exert suction on opposite sides of the inlet ball valve, and means for connecting a hose to the upper opening of the casing.

2. In a compressed air valve, the combination of a casing having a screw threaded end for connection with a cylinder of an engine and an opening at the opposite end, an inlet ball valve and seat therefor in the lower central part of the casing and an outlet ball valve and seat therefor in the upper central part of the casing, a guideway member for aligning the outlet ball valve with the seat thereof, a bifurcated air passageway from the inlet valve to the cylinder arranged to exert suction on opposite sides of the inlet ball valve, and means for connecting a hose to the upper opening of the casing.

3. In a compressed air valve, the combination of a casing having a screw threaded end for connection with a cylinder of an engine and an opening at the opposite end, an inlet ball valve and seat therefor in the lower central part of the casing and an outlet ball valve and seat therefor in the upper central part of the casing, means for holding the ball valves in seated position when the valve is not in use and a bifurcated air passageway from the inlet valve to the cylinder arranged to exert suction on opposite sides of the inlet ball valve, and means for connecting a hose to the upper opening of the casing.

4. In a compressed air valve, the combination of a casing having a screw threaded end for connection with a cylinder of an engine and an opening at the opposite end, an inlet ball valve and seat therefor in the lower central part of the casing and an outlet ball valve and seat therefor in the upper central part of the casing, means for holding the ball valves in seated position when the valve is not in use and, a bifurcated air passageway from the inlet valve to the cylinder arranged to exert suction on opposite sides of the inlet ball valve, an arm on the casing extending over the opening in the end thereof, a cap attached to a hose to fit over the opening in the casing, and a threaded key inserted through the arm on the casing to contact with the cap and hold it in position.

ALBERT H. NELLER.